March 25, 1958 — L. H. KNIBB — 2,828,113
ICE CREAM FREEZER
Filed June 11, 1954 — 2 Sheets-Sheet 1
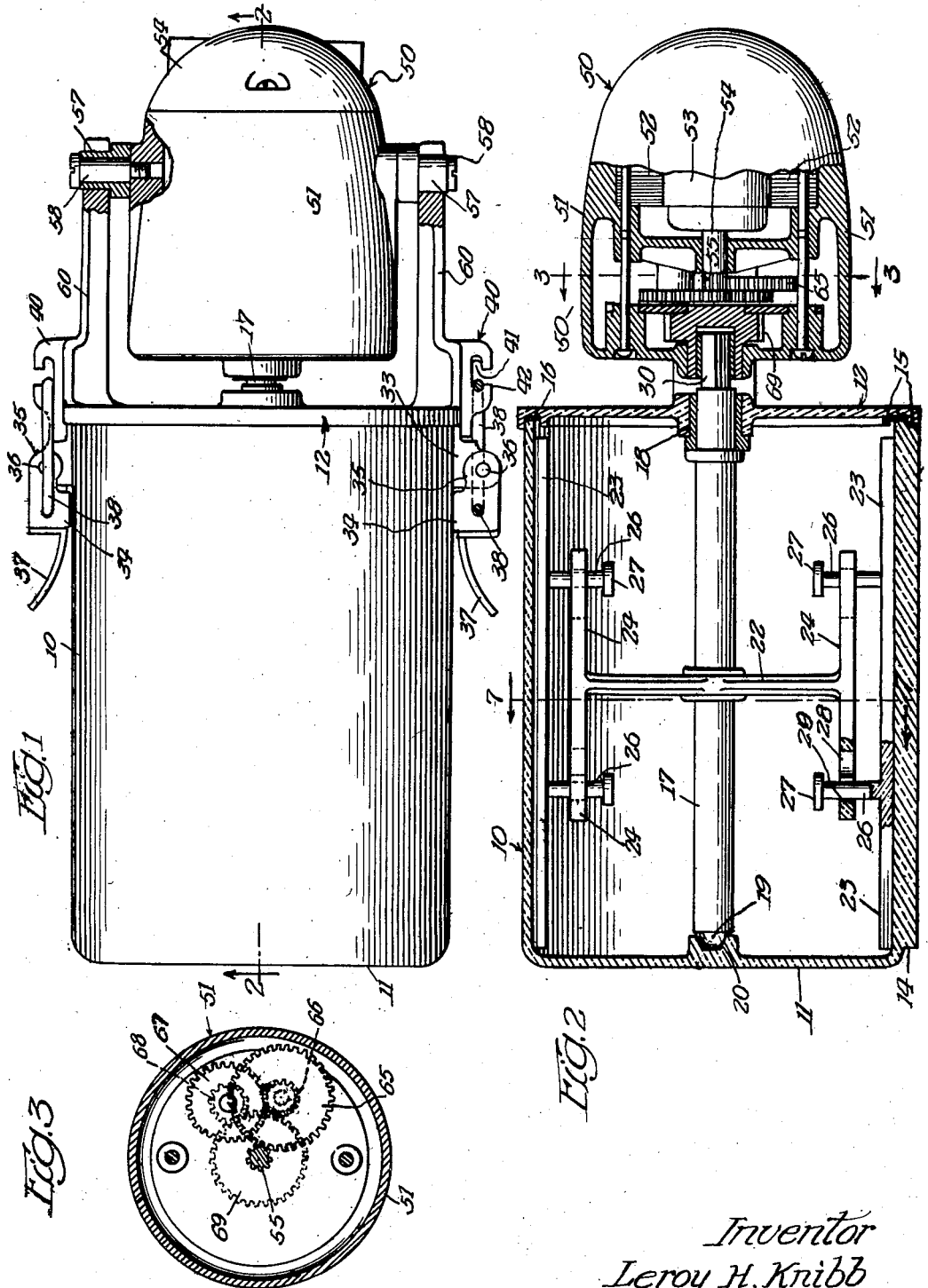
Inventor
Leroy H. Knibb
By Fred Gerlach, his Atty

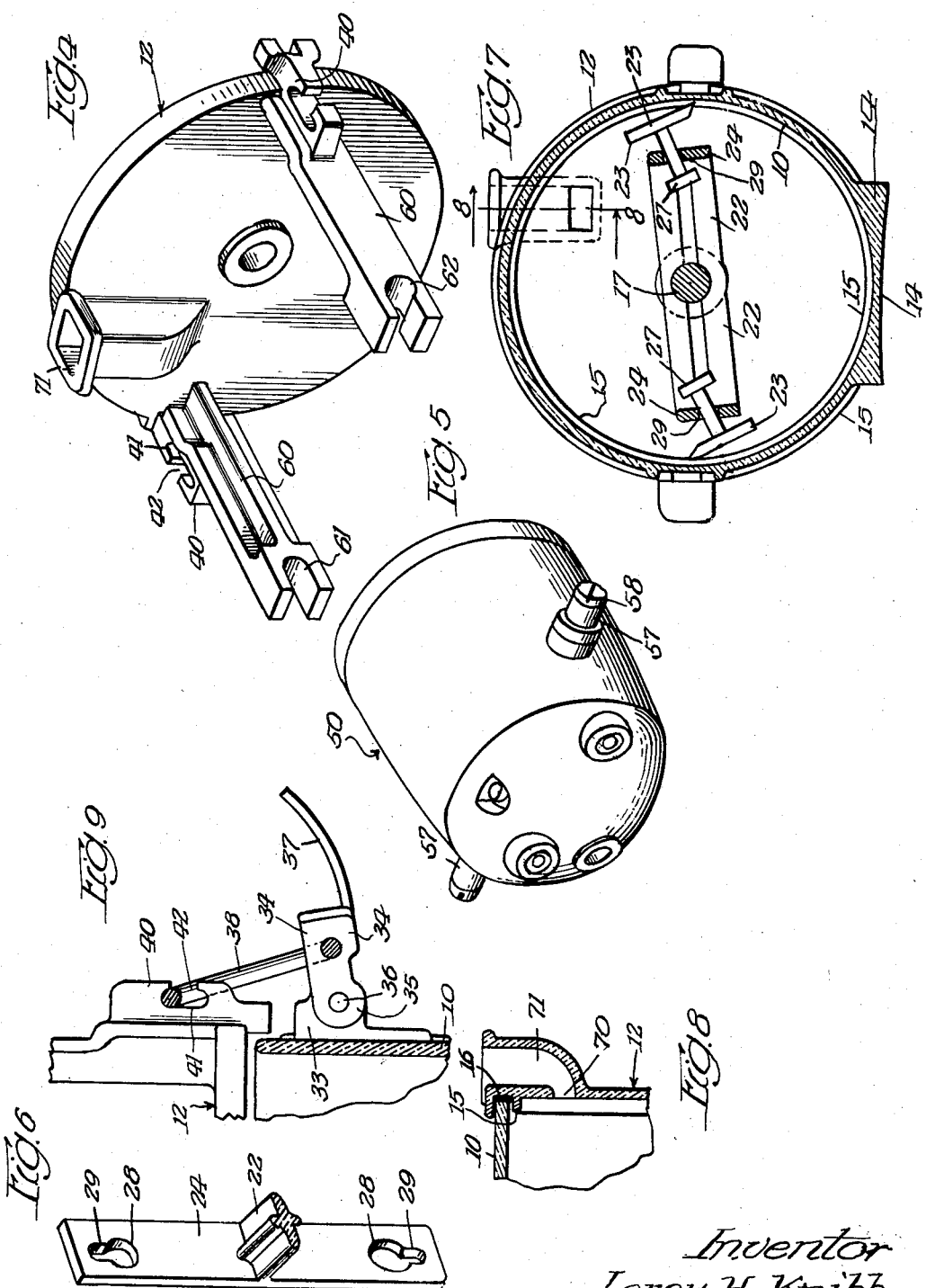

2,828,113
Patented Mar. 25, 1958

2,828,113

ICE CREAM FREEZER

Leroy H. Knibb, Chicago, Ill.

Application June 11, 1954, Serial No. 436,005

10 Claims. (Cl. 259—110)

The invention relates to ice cream freezers of the type which is adapted to be placed in domestic refrigerators, and to agitate the material while it remains in the refrigerator.

The objects of the invention are: to provide a freezer of the type which is adapted to expedite the freezing and whipping operation of cream or mixtures; in which the receptacle cover, agitators and their shafts are formed of suitable plastic material having low thermal conductivity; in which the motor and cover are readily attachable and separable; with devices for forcing apart the cover and the receptacle when frozen together; which is provided with venting which causes the frozen material to be sealed in the container, and other objects which will appear from the detailed description.

The invention consists in the several novel features which are hereinafter set forth and are more particularly defined by claims at the conclusion hereof.

In the drawings:

Fig. 1 is a side elevation, parts being shown in section;

Fig. 2 is a section taken on line 2—2 of Fig. 1;

Fig. 3 is a section taken on line 3—3 of Fig. 2;

Fig. 4 is a perspective view of the cover for the receptacle;

Fig. 5 is a perspective of the electric motor which is demountably supported on the cover;

Fig. 6 is a perspective of one of the agitators or dashers;

Fig. 7 is a section taken on line 7—7 of Fig. 2;

Fig. 8 is a section of the cover taken on line 8—8 of Fig. 7; and

Fig. 9 is a detail partly in section of the locking device for the cover.

The invention is exemplified in a freezer which comprises a container for the material to be frozen and is adapted to be disposed in a freezing compartment of a standard refrigerator. The container comprises a cylindrical receptacle 10 having an integral end enclosure 11, and an open opposite end adapted to be closed by a cover, generally designated 12. The receptacle 10 has an integral base 14 extending longitudinally of its axis which is adapted to rest on a shelf or support in the refrigerator for supporting the container horizontally. The under face of base 14 is dished or concave to provide a space for moisture to freeze a film of ice between the shelf and said under face for chilling the contents of the receptacle. The cover 12 has annular ribs 15 which define an annular groove for a gasket 16 which seats on the rim of the receptacle 10. A shaft 17 has its outer end journalled in a bushing 18 in the cover and its inner end is provided with a semi-spherical stud 19 which fits in a socket 20 in the end 11.

A pair of dashers or bars 23 are rotatable in the receptacle 10 by shaft 17 for agitating or whipping the cream or mixture in the receptacle. Shaft 17 has a pair of integral radial arms 22. The outer end of each arm 22 is provided with an integral longitudinal bar 24, each of which demountably supports one of bars 23. Each dasher bar has a pair of integral studs which extend radially inward and are provided with shanks 26 and heads 27 at their inner ends. Each bar 24 is provided with a pair of slots which include portions 28 of sufficient size to permit the heads 27 to pass therethrough, and a reduced portion 29 in which the shank 26 of a stud will slide. The dasher bars 23 are resilient transversely and when their ends are flexed or bowed toward a bar 23, the heads 27 can pass through portions 28 of the slots in the bars 24 for connection or disconnection of dashers 23 and bars 24. When released, the dasher bar 23 will straighten and spread the shank 26 into the portions 29 of the slots in bars 24 to hold the dasher bars 23 and the bars 24 in connected relation for conjoint rotation. The leading end of each bar 23 is inclined and each bar has a pitch which will cause it to scrape the inner periphery of the receptacle. The width of the constricted portions 29 of the slots in bars 24 is sufficient to limit the pitch of said bars to a desired range. This exemplifies a simple expedient for demountably connecting the dasher bar for rotation with and removal from the shaft 17 when the scrapers are removed from the receptacle.

The shaft 17 has a polygonal stem 30 which projects above the cover 12 for driving relation with an electric motor. The cover 12 is removably supported on the receptacle for loading the material to be whipped into the receptacle for removal of the frozen product. During the freezing of the material, the cover usually becomes frozen onto the receptacle. Diametrically opposite devices for coupling and uncoupling the cover are provided whereby the cover may be moved away from the receptacle by sufficient force to break the ice between the cover and the rim of the receptacle. Each of these devices comprises: a lug 33 fixed on the outside of the container; a lever 34 having ears 35 which are pivotally supported by a pin 36, and a handle or grip 37; a link 38 in the form of a closed loop having one of its ends pivotally connected to lever 34; a lug 40 integral with cover 12, provided with a slot 41 extending in opposite directions from a side opening 42 and adapted to receive the opposite end of link 38. The slot 41 and side opening 42 form, in effect, hooks in which the links 38 can seat for forcibly shifting the cover both to or from the receptacle within the range of the movement of said lever by a lever 34. When the levers 34 are swung downwardly with the upper end of links 38 in slots 41, said levers and links 32 will pass into dead center relation and lock the cover securely on the receptacle. After a freezing operation, and for removal of the cover, levers 35 will operate the outer ends of links 32 away from the receptacle with sufficient force to break any ice between the cover and the rim of the receptacle. These devices are adapted to expeditiously secure the cover on the receptacle after loading and to release the cover after a freezing operation.

An electric motor generally designated 50 is demountably supported on the cover and separably from shaft 17. This motor comprises: a casing 51, field windings 52 in the casing, a rotor 53 on a shaft 54 and a pinion 55 on said shaft. The casing 51 is provided near its outer end with a pair of diametrically opposite trunnions 57 which are secured on the casing 51 by screws 58, and the cover is integrally provided with a pair of diametrically opposite posts or arms 60 between which the motor is supported and which extend along the side of casing 51 and are adapted to receive and support the trunnions 57 with the casing 51 between the posts. The posts 60 are provided with outwardly extending open-ended slots for receiving one of the trunnions upon relative axial movement of the casing and the cover. One of the posts 60 is provided with a straight sided slot 61 and the other with an undercut slot 62. The trunnions 57 are insertable endwise into the slots in posts 60 with the casing 51 between the posts. When the trunnions are placed in the inner ends of slots 61 and 62, the undercut portion of slot 62 will retain by gravity one trunnion seated in one of the posts 60. When the motor is in operation, the rotative torque on the motor casing will urge the trunnion in slot 62 into interfitting relation with the undercut in slot 62 in one post 60 for holding the motor against endwise separation from the cover. The trunnions 37 are disposed near the outer end of the motor casing. This exemplifies quickly operable and simple means for mounting the motor on and separating it from the cover. These posts and trunnions are adapted to support the motor with minimum contact area for reducing thermal conductivity.

The stem 30 on shaft 17 is detachably connected to the motor to permit removal and replacement of the motor from or on the cover. Speed reducing gearing in the casing 51 is adapted to drive shaft 30 from pinion 55 and is detachable from said shaft. Said gearing includes: an idler gear 65 meshing with pinion 55; a pinion 66 rotatable with gear 65; an idler gear 67 meshing with pinion 66; a pinion 68 rotating with gear 67; and a gear 69 coaxial with shaft 17 meshing with pinion 68 and slidably coupled to the end 30 of shaft 17.

In practice, edible material to be frozen is placed in the open receptacle in an amount usually equal to about one-half the capacity of the receptacle to allow for the decrease in density of the material as it becomes whipped by its agitation by the dashers 23. In order to avoid the accumulation of pressure in the receptacle during this operation, the lower end of a vent duct 70 communicates by a port 71 through the cover 12 with the chamber in the receptacle normally above the level of the material. As the density of the whipped or agitated material decreases, it will expand in the receptacle and air will escape through port 71 and duct 70. When the column of whipped material rises to a point near the top of duct 70, and the freezing and whipping operation is completed, the top of the column in duct 70 will be exposed to the temperature in the refrigerator and quickly becomes congealed to seal the material in the body of the receptacle. This action also expedites the whipping of the edible to a light frozen product.

The receptacle 11, cover 12 with its posts 60; shaft 17, agitators 23, arms 22 and bars 24 are made of molded plastic which consists of polyamide from reacting adipic acid with hexamethylene diamine. This plastic has low thermal conductivity so that the transfer of heat from the motor or the gearing is dissipated before it reaches the chamber in the receptacle. This plastic material has no injurious effect on the cream or edible mixtures. The trunnions between the posts on the cover and the motor casing are disposed as remotely from the cover as possible to reduce heat conduction to the receptacle.

The operation will be as follows: the receptacle can be readily loaded with a measured charge of cream or mixture to be whipped and frozen while the cover is separated from the receptacle and the motor is uncoupled from the stem 30 on shaft 17. The shaft 17, arms 22, bars 24 and dasher bars 23 will be inserted into the receptacle and the cover is then placed to close the top of the receptacle. The upper loop of links 38 will be slipped through side openings 42 in lugs 40, and levers 34 will be forced downwardly until they are arrested in dead center relation with links 38 and firmly lock the cover on the receptacle. The motor 50 will then be placed between posts 60 on the cover 12 and the trunnions 57 inserted into the inner ends of the slots 61 and 62 on the outer ends of said posts. The assembly will then be placed in the refrigerator, usually the freezing chamber, with the container resting on its base 14. The motor will then be started and the rotative torque on its casing 51 will urge one of the trunnions 54 into the undercut slot 62 in one of the posts 60 and retain the motor in operative relation with the cover for operating the dasher bars 23 to agitate and whip the material. During this operation, heat conduction between the motor and the receptacle will be minimized by the loose connection between the posts 60 and the motor casing and the low conduction of the plastic material of the cover and the receptacle. The refrigerated air around the container, when the under face of the base 14 of the container is wetted, will freeze a film of ice on said under face for chilling the agitated contents of the receptacle. As the cream or mixture becomes whipped by the continued operation of the dashers 23, its density will decrease and its volume will expand in the receptacle. The air or pressure resulting from such expansion in the receptacle will escape from vent opening 70 and duct 71. At the end of the whipping and freezing operation of a batch of cream or mixture, the column of material will approach the top of the receptacle 10 and the duct 70. The direct contact of the refrigerator air with the upper face of the column when it reaches the top of duct 70, will cause a top film of material to be frozen, which expedites the freezing of cream and seals it in the receptacle.

When the operation is completed, the entire freezer is removed from the refrigerator. The motor can be readily detached from the cover 12 by withdrawal of trunnions 57 from the slots 61 and 62 in posts 60, and the withdrawal of gear 69 from stem 30 of shaft 17. Levers 34 are then swung outwardly to move the links 38 out of dead center relation with said levers. When the outer ends of links 32 pass into the hooks at and engage the outer ends of slots 41, the continued movement of levers 34 will positively force the cover away from the receptacle and break any ice which may have formed between the cover and the receptacle.

The invention exemplifies a freezer of the type adapted to be disposed in a domestic refrigerator; which is efficient in expediting the whipping and freezing operation; in which thermal conduction between the motor and the container in minimized; which includes a receptacle, cover, shaft and agitators of plastic material having low thermal conductivity; in which the motor and the cover are readily detachable and attachable; and is provided with devices for easily forcing the cover and receptacle apart for the removal of the frozen products from the receptacle.

The invention is not to be understood as restricted to the details set forth since these may be modified within the scope of the appended claims without departing from the spirit and scope of the invention.

Having thus described the invention what I claim as new and desire to secure by Letters Patent is:

1. A freezer for use in a refrigerator, comprising: a receptacle having an open end, a removable cover for closing said open end, a shaft coaxial with and in the receptacle, a dasher on said shaft, an electric motor including a casting extending outwardly from the cover and a shaft in said casing having its axis coincident with the axis of the shaft in the receptacle, a detachable connection between said shafts, posts on the cover adapted to extend along and spaced outwardly from the side of the casing, and trunnions on and projecting transversely and outwardly from the sides of the motor casing, adjacent its end remote from the cover, for detachably supporting the motor between, and adjacent the outer ends of, said posts.

2. A freezer for use in a refrigerator, comprising: a receptacle having an open end, a removable cover for closing said open end, a shaft coaxial with and in the receptacle, a dasher on said shaft, an electric motor including a casing and a shaft in the casing having its axis coincident with the axis of the shaft in the receptacle, a detachable connection between said shaft, posts on the cover and extended along and spaced outwardly from the side of the casing, provided with open ended slots, and trunnions on and projecting transversely and outwardly from the sides of the casing, insertable into and movable out of said slots by relative axial movement of the motor and the cover, for detachably supporting the motor between the posts on the cover.

3. A freezer for use in a refrigerator, comprising: a receptacle having an open end, a removable cover for closing said open end, a shaft coaxial with and in the receptacle, a dasher on said shaft, an electric motor including a casing and a shaft in said casing having its axis coincident with the axis of the shaft in the receptacle, a detachable connection between said shafts, posts on the cover adapted to extend along and spaced outwardly from the side of the casing, provided with open ended slots, and trunnions on and projecting transversely and outwardly from the sides of the motor, movable into and out of said slots by relative axial movement of the casing and the cover, for detachably supporting the motor on the cover, one of the posts being provided with means for holding one of the transversely projecting trunnions in interfitting relation by rotative torque of the motor and to release said trunnion and permit its withdrawal from the slot when the motor is stopped.

4. A freezer for use in a refrigerator, comprising: a receptacle having an open end, a removable cover for closing said open end, a shaft coaxial with and in the receptacle, a dasher on said shaft, an electric motor including a casing and a shaft in said casing having its axis coincident with the axis of the shaft in the receptacle, a detachable connection between said shafts, posts on the cover adapted to extend along and spaced outwardly from the side of the casing, provided with open ended slots, and trunnions on and projecting transversely and outwardly from the sides of the casing, movable into and out of said slots by relative axial movement of the motor and the cover, for detachably supporting the motor on the cover, the slot in one of the posts being undercut for an interfit with one of the transversely projecting trunnions and detachably holding it in the undercut by rotative operating torque of the motor, and releasing said trunnion for withdrawal from the slot when the motor is stopped.

5. A freezer for use in a refrigerator, comprising: a cylindrical receptacle, a shaft in said receptacle, a motor for driving said shaft, a transversely resilient agitator extending longitudinally of the container, a bar rotatable with the shaft, and a detachable connection between the dasher and the bar including a pair of studs having shanks and heads on one of said connected parts, the other part having slots through which the heads can pass when the dasher is bent and extensions in which the shanks are spread and removably held when the dasher is straightened.

6. A freezer for use in a refrigerator, comprising: a cylindrical receptacle, a shaft in said receptacle, a motor for driving said shaft, a transversely resilient dasher extending longitudinally of the container, a bar on the shaft, and a detachable connection between the dasher and said bar, including inwardly extending studs on the scraper having shanks and heads extending inwardly therefrom, and slots in the bar through which the heads can pass when the dasher is flexed and extensions in which the shanks are spread and removably held when the dasher is straightened.

7. A freezer for use in a refrigerator, comprising: a cylindrical receptacle, a shaft in said receptacle, a motor for driving said shaft, a transversely resilient dasher extending longitudinally of the container, a bar on said shaft, and a detachable connection between the dasher and the bar including inwardly extending studs having shanks and heads, and slots in the bar through which the heads can pass when the dasher is bent and extensions in which the shanks are spread and removably held when the dasher is straightened.

8. A freezer for use in a refrigerator, comprising: a cylindrical receptacle, a shaft in said receptacle, a motor for driving said shaft, a transversely resilient dasher extending longitudinally of the container, a bar integral with the shaft and a detachable connection between the dasher and the bar including a pair of studs on one of the connected parts having shanks and heads, the other part having slots through which the heads can pass when the dasher is bent and extensions in which the shanks are spread and removably held when the dasher is straightened, said shaft, bar and dasher being formed of plastic having low thermal conductivity.

9. The combination with a freezer for use in a refrigerator including a receptacle having an open end and a mating detachable cover for closing said end, a shaft with a dasher in the receptacle, and a motor mounted on the cover and detachably connected to said shaft, of detachable locking means between said mating parts, comprising a pair of levers having one of their ends pivoted at diametrically opposite points on one of said mating parts, links having one of their ends pivoted to the levers, respectively, and means for detachably connecting the other ends of the links to the other of said mating parts, including abutments on and spaced apart on said last named mating part and relatively to which the links are operable, by the diametrically opposite levers for alternately and positively forcing opposite portions of the cover and receptacle together or spreading them apart when they are frozen together.

10. The combination with a freezer for use in a refrigerator including a receptacle having an open end and a mating detachable cover for closing said end, a shaft with a dasher in the receptacle, diametrically opposite posts on the cover and a motor removably mounted on the posts and detachably connected to said shaft, of detachable locking means between said mating parts, comprising a pair of levers having one of the ends pivotal at diametrically opposite points on one of said mating parts, links having one of their ends pivoted to the levers, respectively, and means for detachably connecting the other ends of the links in alignment with said posts to the other of said mating parts, including abutments on and spaced apart on said last named mating part and relatively to which the links are operable by the diametrically opposite levers for alternately and positively forcing opposite portions of the cover and receptacle together or spreading them apart when they are frozen together.

References Cited in the file of this patent

UNITED STATES PATENTS

| 1,837,565 | McDougall | Dec. 22, 1931 |
| 2,474,730 | Espinasse et al. | June 28, 1949 |
| 2,488,668 | Knibb | Nov. 22, 1949 |
| 2,599,021 | Se Bastian | June 3, 1952 |

FOREIGN PATENTS

| 57,736 | Austria | Feb. 25, 1913 |
| 599,625 | France | Oct. 23, 1925 |